United States Patent [19]

Cullo et al.

[11] Patent Number: 4,912,234
[45] Date of Patent: Mar. 27, 1990

[54] PROCESS FOR THE OXIDATION OF AROMATIC HYDROCARBONS

[75] Inventors: Leonard A. Cullo, Hempfield Township, Westmoreland County; Elliott V. Nagle, Jr., Franklin Boro; Edward F. Restelli, Jr., Oakmont Boro, all of Pa.; Thomas J. Yogan, Ft. Mitchell, Ky.

[73] Assignee: Aristech Chemical Corporation, Pittsburgh, Pa.

[21] Appl. No.: 374,413

[22] Filed: Jun. 30, 1989

Related U.S. Application Data

[60] Division of Ser. No. 117,872, Nov. 9, 1987, which is a continuation-in-part of Ser. No. 882,874, Jul. 7, 1986, Pat. No. 4,705,770.

[51] Int. Cl.$^4$ .................................. C07D 307/89
[52] U.S. Cl. ............................ 549/249; 549/248
[58] Field of Search .......................... 549/248, 249

[56] References Cited

U.S. PATENT DOCUMENTS

| | | | |
|---|---|---|---|
| 2,458,818 | 1/1949 | Young | 260/683.15 |
| 3,565,919 | 2/1971 | Friedrichsen et al. | 549/249 |
| 3,692,699 | 9/1972 | Hojo et al. | 502/218 |
| 3,810,921 | 5/1974 | Maselli et al. | 260/346.4 |
| 3,862,960 | 1/1975 | Cheavens et al. | 260/346.4 |
| 3,926,846 | 12/1975 | Ono et al. | 252/435 |
| 3,948,807 | 4/1976 | Fuchigami et al. | 252/456 |
| 4,046,780 | 9/1977 | Nakamishi et al. | 260/346.4 |
| 4,096,094 | 6/1978 | Blechschmitt et al. | 502/218 |
| 4,196,101 | 4/1980 | Wilson et al. | 252/439 |
| 4,284,571 | 8/1981 | Sato et al. | 260/346.4 |
| 4,382,022 | 5/1983 | McDaniel | 252/452 |
| 4,424,320 | 1/1984 | McDaniel | 526/106 |
| 4,481,304 | 11/1984 | Sato et al. | 502/209 |
| 4,482,643 | 11/1984 | Harju et al. | 502/242 |
| 4,489,204 | 12/1984 | Neri et al. | 549/248 |

FOREIGN PATENT DOCUMENTS

| | | |
|---|---|---|
| 76340 | 4/1975 | Australia . |
| 1169912 | 5/1964 | Fed. Rep. of Germany . |
| 1228909 | 4/1971 | United Kingdom . |
| 2104066A | 3/1983 | United Kingdom . |
| 2143225A | 2/1985 | United Kingdom . |

OTHER PUBLICATIONS

Sembaev et al, "Principles for the Selection of Vanadium Oxide Catalysts for Partial Oxidation and Oxidative Ammonolysis of Aromatic Compounds", Geterog. Katal., Mater. Vses. Konf. Mekh. Katal, Reakts., 3rd, 1981, (Published 1982), pp. 58–61.

Montgomery, "Oxidation of Ortho-Xylene Over Alkali Metal Promoted Vanadia-Titania Catalysts", W. R. Grace & Co., Baltimore, Md., 2 sheets.

Haase et al, "Quick Screening Method for Industrial Phthalic Anhydride Catalysts", Applied Catalysis, 19(1985), pp. 13–19, Elsevier Science Publ.-Amsterdam.

Saleh et al, "Comparison of $V_2O_5/TiO_2$, (Anatase) and $V_2O_5/TiO_2$ (Rutile): Promoting Effect of the Support", American Chemical Society, N.Y. Meeting, Apr. 13–18, 1986, pp. 272–276.

Rusiecka et al., "O–Xylene Oxidation on $V_2O_5$—$TiO_2$ Oxide System, II. ESR Studies of the Catalysts", Applied Catalysis, 10(1984), pp. 101–110, Elsevier Science Publ.-Amsterdam.

Gasior et al, "O–Xylene Oxidation on the $V_2O_5$—$TiO_2$ Oxide System, I. Dependence of Catalytic Properties on the Modification of $TiO_2$", Applied Catalysis, 10(1984), pp. 87–100, Elsevier Science Publ.-Amsterdam.

Primary Examiner—Richard L. Raymon
Attorney, Agent, or Firm—William L. Krayer

[57] ABSTRACT

Catalyst compositions are disclosed containing potassium pyrosulfate, cesium pyrosulfate, supported on an inorganic oxide. The catalysts will selectively oxidize naphthalene and/or o-xylene to phthalic anhydride in a fluidized- or fixed-bed reactor system. Sulfur-containing gaseous promoter may be fed with the aromatic hydrocarbon to enhance selectivity.

6 Claims, No Drawings

PROCESS FOR THE OXIDATION OF AROMATIC HYDROCARBONS

This is a divisional application, of application Ser. No. 117,872, filed on November 9, 1987, which application is a continuation-in-part of our co-pending application entitled "Method of Making Anatase-Titania Attrition-Resistant Catalyst Composition", Ser. No. 882,874, filed July 7, 1986, now U.S. Pat. No. 4,705,770.

TECHNICAL FIELD

It is known that phthalic anhydride can be produced by the selective oxidation of o-xylene or naphthalene with a gas containing oxygen in the presence of a fixed or fluidized vanadia or vanadia/titania catalyst typically made for use with one feedstock or the other. Vanadia is the most important oxidizer in the catalyst and the value of titania appears to be related to its effect on the adsorption of oxygen. In addition to vanadia and titania as the main components of the catalyst "active matter", the best catalysts and processes known in the art heretofore employ supplemental agents such as various metal oxides, alkalies, and sulfur trioxide; these constituents are usually referred to by terms such as "modifiers", "catalyst activators" and "promoters" and various explanations are offered for their effects. Alkali metals may regulate the valence state of vanadium-oxigen bonds or may form eutectic mixtures, thereby lowering the melting point of the catalyst active matter. These catalytic compositions are usually supported on carriers that may be porous or nonporous, and inert or interactive with the catalytic components.

Manufacture of phthalic anhydride using prior art catalysts has become more and more difficult economically as the prices of naphthalene and o-xylene have increased, increasing the cost of the phthalic anhydride and affecting the demand for products made with phthalic anhydride relative to competing materials. Most of the fixed-bed catalysts have been designed to process orthoxylene and have much lower yields to phthalic anhydride if used to process naphthalene. Such prior art catalysts do not have the flexibility to allow a change of feeds as the cost and availability of naphthalene and o-xylene shift relative to each other. Moreover, no fluid-bed catalysts and processes for oxidizing o-xylene have been proven on a commercial scale.

This invention relates to the use of novel catalysts for oxidizing hydrocarbons. In particular, it relates to the use of such catalysts for making phthalic anhydride from either ortho xylene or naphthalene in either a fixed or a fluid bed.

BACKGROUND ART

The major difference between catalysts known in the art for converting o-xylene and naphthalene to phthalic anhydride has been in the catalyst support that gives the best results; conversion of o-xylene has been thought to require the use of a titania bearing support, with titania preferably in the anatase form, whereas straight silica is the preferred support for naphthalene oxidation. Fluidized beds using naphthalene feed are generally operated at throughputs (ratio of hydrocarbon feed per hour to the weight of catalyst, F/W) of about 0.05, and alkali metal sulfates are usually included in the catalysts used in these reactors to moderate the reaction, reducing the activity of the catalyst but increasing the selectivity to phthalic anhydride. Such catalysts favor cleavage of the aromatic ring followed by oxidation of the exposed carbons.

Fixed-bed reactors using o-xylene feed are operated at high F/W ratios such as 0.20 and can utilize a much more active catalyst. The vanadia-titania catalysts employed favor oxidation of the methyl groups present rather than cleavage of the aromatic ring. The differences among the various commercial catalyst compositions are slight; some employ variations in the promoters such as potassium oxide, antimony oxide and phosphorous oxides, and some are used in two stages, with the reaction mixture initially contacting a catalyst of relatively low activity and then a catalyst of high activity.

A fluid-bed catalyst and process disclosed in U.S. Pat. No. 3,565,919 to Friedrichsen et al was said to give satisfactory yields of phthalic anhydride using orthoxylene feed. However, titania-silica produced by the teachings of U.S. Pat. No. 3,565,919 results in a substantial portion of the titania being present in the rutile phase. Saleh, Wachs, Chan and Chersich, "Comparison of $V_2O_5/TiO_2$ (Anatase) and $V_2O_5/TiO_2$ (Rutile):Promoting Effect of the Support", Symposium on Fundamental Chemistry of Promoters and Poisons in Heterogeneous Catalysis Presented Before the Division of Petroleum Chemistry, Inc., American Chemical Society, New York Meeting, April 13–18, 1986, pages 272–276; and Gasior, Gasior and Grzybowska "O-Xylene Oxidation on the $V_2O_5$—$TiO_2$ Oxide System, Dependence of Catalytic Properties on the Modification of $TiO_2$", Aplied Catalysis, 10 (1984) pages 87–100 using orthoxylene oxidation catalysts produced with anatase and with rutile titania, shows that the former effect more selective oxidation to phthalic anhydride, while the PA and C-8 yields with catalysts containing rutile were much lower. The literature (Sembaev, Suvorov, Saurambaeva and Ivanovskaya, "Principles for the Selection of Vanadium Oxide Catalysts for Partial Oxidation and Oxidative Ammonolysis of Aromatic Compounds", Geterog. Katal., Mater. Vses Konf. Mekh. Katal, Reakts., 3rd, 1981, [published 1982] pp. 58–61) further shows that rutile $TiO_2$ is isomorphous with $V_2O_5$ which suggests that these oxides will form solid solutions during prolonged exposure at high (reaction) temperatures thereby limiting catalyst life. The form of $TiO_2$ present in the catalyst is not addressed in U.S. Pat. No. 3,565,919.

A catalyst disclosed in U.S. Pat. No. 3,862,960 to Cheavens et al containing a relatively high percentage of alkali pyrosulfates reported good yields at air-to-feed weight ratios of 10 and F/W of 0.05, which are appropriate rates for fluid bed operation; however, titania was employed as the catalyst support. Titania does not fluidize well and does not have enough attrition resistance to be useful for a practical length of time in a fluidized bed.

One of the catalysts and one of the processes representative of the prior art are described in U.K. Patent Application GB 2,104,066 A. FIG. 1 of that patent confirms that the yields obtained using naphthalene as a feedstock are different from those obtained with o-xylene over the same catalyst, and that, with the catalysts of the prior art, the yields obtained from mixtures of the two progress linearly from the yield obtained with 100 percent of one hydrocarbon to the yield obtained with 100 percent of the other.

It is an object of our invention to provide a versatile catalyst composition that can be used in either a fixed- or fluidized-bed process for the catalytic oxidation of o-xylene and/or naphthalene to phthalic anhydride, one that can accommodate the inclusion of sulfur-containing promoter with the reactants, one that will enable processing of impure naphthalene, and one that can be used to improve phthalic anhydride-manufacturing processes of the prior art. It is another object of our invention to provide a catalyst and process for the manufacture of phthalic anhydride which can convert mixtures of o-xylene and phthalic anhydride, providing higher yields and therefore more economical manufacture than any in the prior art.

DISCLOSURE OF INVENTION

Our invention comprises a catalyst composition that efficiently oxidizes o-xylene or naphthalene or mixtures of the two to phthalic anhydride and produces higher yields than catalysts in the prior art when operating with mixed feeds. It also contemplates particular feed compositions in the process of oxidation to obtain such high yields. The catalyst composition is obtained by preparing a solution of vanadyl sulfate, potassium pyrosulfate and cesium pyrosulfate or cesium sulfate in sulfuric acid and impregnating with this solution a silica substrate material of suitable size and porosity with which titania in the anatase form has been co-mingled.

The substrate for this disclosure is an active high silica material, natural or synthetic, containing a maximum of 30 percent alumina and preferably less than 10 percent alumina which is detrimental to the selectivity for the oxidation orthoxylene to phthalic anhydride. Such preferred materials include spherical and ground silica, zeolites, suitable silicates, high silica clays, and calcium sulfate. The activity of the silica may be related to the amount of surface hydroxyl groups and surface reactivity. According to "The Colloid Chemistry of Silica and Silicates" by Iler, when calcined above 600° C., silica will enter but the number of surface hydroxyl groups per unit area remains constant. Further, the splitting of hydroxyl groups and water that does occur leaves the surface in a state of strain or reactive condition. The extent of these effects is related to the initial surface area. Therefore, to be active, the surface area of the substrate of the catalysts of this invention should be greater than 10 $m^2/gm$ and preferably greater than 50 $m^2/gm$.

For producing a fluid bed catalyst, it is necessary that the substrate be attrition resistant and have a size range of about 30 to 150 microns so as to be fluidizable and have pore volume of greater than 0.01 cc/gm and preferably greater than 0.4 cc/gm so that the added titania will be present in the pores and crevices of the substrate and therefore shielded from the abrasion which occurs in a fluidized bed reactor.

For fixed bed reactor use, the catalyst particles may be agglomerated to a larger size before final calcination. The agglomeration may be accomplished by using a small amount of high silica binder such as colloidal silica, bentonite, or other binding material and together with procedures familiar to those skilled in the art of agglomeration such as pelletizing or extruding or the catalyst may be produced using a larger substrate such as a ring or sphere.

The titania-bearing substrate may be prepared by the method, described in our co-pending patent application, "Method of Making Anatase-Titania Attrition-Resistant Catalyst Composition", Ser. No. 882,874, filed July 7, 1986, now U.S. Pat. No. 4,709,770, of which this is a continuation-in-part and which is incorporated by reference. As stated therein, the preferred method of making the titania-bearing catalyst support is to impregnate the substrate with a solution containing a soluble acid salt of titanium. Examples of such solutions are acid solutions of ammonium titanyl sulfate, aqueous solutions of ammonium titanyl sulfate, titanyl sulfate solution produced from the digestion of titania hydrate pulp, peroxide treated titanyl sulfate solution, aqueous titanyl sulfate solution, or diluted titania hydrate pulp. The impregnated substrate is then dried and calcined, yielding a stabilized anatase titania-substrate combination. Multiple wettings and dryings and intermediate calcinations may be employed or the procedure may be conducted continuously in appropriate equipment.

Specifically, the preferred method of making the attrition-resistant support comprises impregnating an attrition resistant, porous substrate having a pore volume greater than 0.1 cc/g with from 2 to 95% $TiO_2$ by wetting the substrate with a solution of a soluble acid salt of titanium, drying the impregnated substrate, heating it to decompose the titanyl sulfate, and calcining the resulting impregnated composition at a temperature of at least 450° C. to obtain a calcined composition which displays essentially the characteristics of anatase titania as shown by an anatase X-ray peak at d 3.52 and no rutile X-ray peak at d 3.25.

The amount of titania in the finished titania/substrate composition, for purposes of this application, should be at least about 4 percent per $TiO_2$. More than one wetting with the soluble acid salt of titanium may be used. As the proportion of titania is increased, the combination of activity and selectivity of the catalyst is altered in a manner such that the yield of phthalic anhydride increases. However, as the amount of titania exceeds 60% $TiO_2$, the accompanying increases in density and dielectric properties of the catalyst are less favorable to the fluidization characteristics and limit the use of the invention in a fluid bed system. For the optimum combination of catalyst activity, selectivity, and fluidization characteristics, we prefer to limit the titania in the titania/substrate composition to between about 20 and about 60% $TiO_2$.

In accordance with the present disclosure, the calcined titania-substrate composition is then impregnated with a solution of vanadyl sulfate, potassium pyrosulfate, cesium pyrosulfate, and optionally excess sulfuric acid as described below, dried and calcined to produce the final catalyst. Again, a multiple wetting and drying prior to the final calcination may be used. Any soluble vanadium salt, such as ammonium vanadate or vanadyl sulfate, which, upon decomposition and final calcination, will yield vanadium pentoxide, may be used as the vanadia source for the catalyst as an alternate or in addition to the preferred vanadyl sulfate.

Specifically, the catalyst composition which is placed on the support comprises up to about 10 percent by weight of the total finished composition potassium present as potassium pyrosulfate, up to about 12 percent by weight of the total finished composition cesium present as cesium pyrosulfate, up to about 5 percent of the total finished composition sulfuric acid, from 0.1 to 8 percent of the total finished composition vanadium present as vanadium pentoxide, with the total of titania and silica comprising about 50 to about 98 percent of the total finished composition.

While the catalyst composition may be any combination within the limits defined above, when it is to be used in a fluidized bed reactor, we prefer to prepare the composition to contain 0.5 to 4 percent by weight vanadium present as $V_2O_5$, from 2 to 6 percent potassium present as potassium pyrosulfate, from 2 to 8 percent present as cesium pyrosulfate, with the total of titania plus silica comprising 60 to 92 percent; all percentages are based on the total finished composition.

Without intending to be bound by any theories, it is believed that the catalysts of this disclosure are unique in that they possess two types of sites—vandia-titania sites which promote the selective oxidation of orthoxylene, and vanadia-silica sites moderated with potassium and/or cesium pyrosulfates which promote selective oxidation of naphathalene. Because of their attrition resistance, appropriately sized catalyst particles can be used in fluidized bed reactors, or, in agglomerated form or larger original size, in fixed bed reactors. They will process orthoxylene or naphthalene or mixtures thereof and in fact, are best suited to processing mixed feeds. It has been found that the catalyst performance with a mixed feed is synergistic and that the resulting yield to phthalic anhydride with a mixed feed is higher than the phthalic anhydride yield determined by appropriately proportioning the yields obtained with either feed separately in accordance with the mixed feed composition.

Sulfur-containing gaseous promoter such as $SO_2$ may be fed with the o-xylene and/or naphthalene to enhance selectivity; this sulfur may be specially introduced as by feeding sulfur dioxide, or the sulfur may be introduced by the use of a sulfur-containing hydrocarbon feed which produces gaseous sulfur compounds under the oxidation conditions of the process. However, the catalyst will also function well without the addition of a sulfur containing promoter.

The phenomena of attrition depend on the mechanical strength as well as the physical form of the particles, in addition to the conditions of the oxidizing system. Ground particles with irregular shapes and rough edges will be vulnerable to higher attrition rates than smooth spherical particles. Attrition rates must be determined by an appropriate experimental attrition test. One such attrition test accepted in the industry is described in the 1957 pamphlet "Test Methods for Synthetic Fluid Cracking Catalysts" (pp. 42–49) by American Cyanamid Corporation, which is incorporated herein by reference. In the test, three air jets having velocities of approximately 890 ft/sec. impart high motion to the particles causing collisions which cause attrition. The fines generated by the process are carried from the unit by elutriation. The amount of attrited or overhead material per unit time is defined as the attrition rate. This parameter can be correlated with the catalyst make-up rate in a commercial fluidized bed reactor due to attrition. Equipment such as described above was used to measure the attrition rates of the materials produced by the methods of this disclosure. Example 3 hereafter recites the results of attrition tests.

The normal test time is 45 hours although several extended tests for 100+ hours were also conducted. Fifty grams of sample were charged to the tube of the unit. The samples were presized at −80, +325 mesh by dry screening, this being approximately the initial size range for fluidized bed catalysts before breakdown. However, some finer material clinging to the larger particles survived the screening and thus constituted the initially elutriated fines in the test. This was the material collected overhead after five hours. The rate of attrition of a tested material was determined after elutriation of the initial fines and when an essentially constant rate was reached, by constructing a tangent to the plot of wt./percent overhead vs. time.

In the examples below, the catalysts were tested in a 1½" ID by 29" long fluidized bed laboratory scale reactor. The process air to the unit passes through a Brooks flow controller to a ¾" ID×20" long preheater vaporizer. In some runs, $SO_2$ was also added to the air stream through a low-rate (0–20 cc/min.) flow controller. Ortho-xylene is fed to the system from a pressurized reservoir through a calibrated capillary maintained at constant temperature. In some runs, naphthalene was also used as the sole feed or as a co-feed mixed with orthoxylene. Naphthalene is also fed from a pressurized reservoir through a capillary, both contained in an oven heated to 120° C., and then through a heat-traced line to the vaporizer. The vaporized feed then passes through the fluid bed reactor to an air-cooled, down-flow condenser, then to a bubbler to remove the entrained low-temperature organics and through a back pressure regulator to vent. A slip stream is taken off just after the reactor to an FID chromatograph for determination of condensable solid products ortho-xylene (OX), tolualdehyde (TI), phthalic anhydride (PA), naphthalene (N), phthalide (PI) and naphthoquinone (NQ) and to a TC chromatograph for analysis of fixed gases. Yields are calculated as weight per 100 weight hydrocarbon feed. $C_8$ reaction products were normally grater than 98 percent phthalic anhydride.

Thermocouples were positioned at the reactor distributor plate and at the 4" and 9" levels of the catalyst bed. Readings of these thermocouples were used to check the fluidization characteristics of the catalyst. A 150 gram cataylst charge was used for most of the example runs of this disclosure providing a 6" static charge in the reactor.

EXAMPLE 1

Two hundred eight-five grams of PQ Corporation's CS1022 ground silica was co-mingled with concentrated titanyl sulfate solution containing 28 percent $TiO_2$ in accordance with the procedure of Example 18 of our above-referenced co-pending patent application "Method of Making Anatase-Titania Attrition-Resistant Catalyst Composition". The resulting $TiO_2/SiO_2$ material was calcined for 3 hours at 650° C. Four hundred grams of this material was then wetted to incipient wetness using 250 ml of a solution prepared by adding 50 gm $VOSO_4.2H_2O$, 90 gm $K_2S_2O_7$, 50 gm $Cs_2SO_4$ and 6 cc concentrated $H_2SO_4$ to water to a total solution volume of 500 cc. The wet material was dried to remove water, then rewet again with 250 ml of the above solution, and calcined for 4 hours at 450° C. The resulting catalyst, No. 1 of Table I, had the following composition: % $TiO_2$=32.2, % V present as $V_2O_5$=1.80, % K present as $K_2S_2O_7$=4.64, % Cs present as $Cs_2S_2O_7$=6.53, % S=6.4%, and the balance $SiO_2$.

EXAMPLE 2

Catalyst 2 was produced in fashion similar to catalyst 1 of example 1 using ammonium titanyl sulfate solution as the titania source. The active silica containing anatase titanium and made according to Example 19 of our co-pending patent application Ser. No. 882,874 was first doped with 13 percent $TiO_2$ and calcined for 64 hours at 800° C. The final co-mingled $TiO_2/SiO_2$ material was calcined for 8 hours at 800° C. The composition of the final catalyst after wetting with a solution containing 7.1 percent vanadyl sulfate, 12.9 percent potassium pyrosulfate, 7.1 percent cesium sulfate, and 1.4 percent sulfuric acid and then calcining for 4 hours at 450° C. is listed in Table I.

One hundred fifty grams of the catalyst was charged to the laboratory scale fluidized bed reactor described above and operated with O-X feed at a hydrocarbon feed to catalyst weight (F/W) ratio of 0.05, air to hydrocarbon feed (A/F) ratio of 10, a reactor temperature of 700° F. and pressure of 5 psig. This operation was maintained for 228 hours, at which time the catalyst was converting 99 percent of the orthoxylene feed with a $C_8$ yield of 96 wt per 100 wt O-X feed. Burnup of the feed to CO, $CO_2$ and water vapor was 29 percent. Actual residence time of the O-X in the catalyst bed was 5.6 seconds. Reactor temperature was increased to 735° F. and the burnup increased to 39 percent with the $C_8$ yield dropping to 80. The reactor was then returned to the conditions of the initial data period and a good repeat of the catalyst performance at 228 hours was made at 440 hours. The run was terminated after about 550 hours and examination of the catalyst showed no deterioration due to attrition.

EXAMPLE 3

Catalyst 3 was produced by the process of Example 1 of our co-pending patent application Ser. No. 882,874 using ammonium titanyl sulfate as the titania source. The final $TiO_2/SiO_2$ material was calcined for 8 hours at 950° C. The composition of the final catalyst after wetting with a solution containing 6.8 percent vanadyl sulfate, 15.4 percent potassium pyrosulfate, 8.4 percent cesium sulfate, and 1.1 percent sulfuric acid and then calcining for 4 hours at 450° C. is listed in Table I.

Fifty grams of catalyst 3 sized −80, +325M was charged to the attrition apparatus described above and an initial fines content of 6.7 percent and an attrition rate of 0.36%/hr were measured for the material.

One hundred fifty grams of catalyst 3 was tested in the laboratory scale fluidized bed reactor described above with O-X feed starting at the same operating conditions as those used in example 2 above. After 84 hours operation, the catalyst conversion was 88 percent and the $C_8$ yield was 33. The reactor temperature was then raised to 745° F., increasing the O-X conversion to 92 percent with a resulting 80 $C_8$ yield. The temperature was then dropped to 680° F. and the F/W to 0.042 resulting in an O-X conversion of 88 percent and a $C_8$ yield of 88. The run was continued for 410 hours, after which the catalyst showed no deterioration due to attrition.

Catalysts 2 and 3 which had been run in the fluidized bed reactor were combined and 50 grams of the composite sized −80, +325M were charged to the attrition apparatus described above. An initial fines content of 5.6 and an attrition rate of 0.3/hr were determined for the material in a 45 hour attrition test. A second sample of the above composite, again sized −80, +325M was charged to the attrition apparatus and an initial fines value of 5.5% and an attrition rate of 0.238%/hr were determined for the material in a long term 100 hour attrition test.

EXAMPLE 4

Catalyst 4 was produced by the process of Example 14 of our co-pending patent application Ser. No. 882,874 using water soluble ammonium titanyl sulfate as the titania source. The final co-mingled $TiO_2/SIO_2$ material was calcined for 5 hours at 800° C. and the final catalyst composition produced after wetting with a solution containing 89 percent vanadyl sulfate, 15.1 percent potassium pyrosulfate, 8.1 percent cesium sulfate and 1.1 percent sulfuric acid and then calcining for 4 hours at 450° C. is listed in Table I. This catalyst was charged to the laboratory scale fluidized bed reactor and operated with O-X at 700° F. reactor temperature, 5 psig pressure, A/F of 10 to 11 and F/W=0.08. After 91 hours, the catalyst conversion was 91 percent, the PA yield 92 and the $C_8$ yield 95. After 116 hours operation at F/W=0.053, the O-X conversion was 97 percent and the $C_8$ yield 92.

EXAMPLE 5

Catalysts 2, 3, and 4 were also run in a fixed bed micro-catalytic reactor. In this system, 1 gram of catalyst was packed in a 0.1875"ID stainless steel tube bent in a U and submersed in a molten lead bath.

Catalysts 2, 3 and 4 were run in the microreactor as described above with ortho-xylene feed at A/F=10, 360° C., approximately 2 psig, and F/W values of mostly 0.06 and 0.12; however, flow rates as high F/W=0.60 were also tested. Off gas from the reactor was analyzed chromatographically and reactor yields and selectivity were calculated as above. For conversion from 60 to 90 percent, the average $C_8$ selectivity obtained with the catalysts was about 115. At complete conversion the selectivity was about 100.

EXAMPLE 6

Catalyst 5 was produced by adding 1.1 percent vanadyl sulfate to approximately 28.8 percent water soluble ammonium titanyl sulfate solution and co-precipitating $V_2O_5$ and $TiO_2$ from the solution into PQ CS 1022 silica. No additional moderators were added and the resulting $TiO_2/V/SiO_2$ co-mingled catalyst was calcined for 4 hours at 800° C. Composition of the resulting catalyst is given in Table I. The catalyst was then tested in the laboratory scale fluidized bed reactor with O-X feed at an A/F ratio of 26.8 and 600° F. At these conditions, the O-X conversion was 77 percent and the corresponding $C_8$ yield was 60.

EXAMPLE 7

Catalyst 5 was run in the microcatalytic fixed bed reactor described above with O-X feed at F/W=0.48 and 0.60, A/F=10 and 320° to 330° C. Orthoxylene conversion approximately 98 percent and the resulting $C_8$ yield was 86 to 94. The reaction product contained 7 to 8 PI.

EXAMPLE 8

Catalyst 6 was produced in fashion similar to catalyst 1 of example 1 using digested titanyl sulfate hydrate pulp as the titania source. The final $TiO_2/SiO_2$ material was calcined for 8 hours at 800° C. to obtain the composition recited in Table I. The catalyst was first tested with O-X feed using straight process air in the laboratory scale fluidized bed reactor. Catalyst performance was measured from 630° to 675° F. at an F/W=0.0140 and A/F of 22.6. Best operating temperature for the catalyst with these feed conditions was 650° F. with O-X conversion being 92 percent and $C_8$ yield 92.

$SO_2$ was then added to the process air stream in the ratio of 1178 vol air/vol $SO_2$. At 660° F. and the above feed conditions, $C_8$ yield increased to 100 to 90 percent O-X conversion. At 680° F., $C_8$ yield was 104 at 96 percent conversion. Comparison of resulting data with and without $SO_2$ showed that $SO_2$ reduced conversion at a given temperature by about 2 percent while increasing $C_8$ yield by 8 to 12 points. A/F rate was then reduced to 14 and F/W increased to 0.03. With the above level of $SO_2$ in the process air, at 700° F., the resulting $C_8$ yield was 95 at 94 percent O-X conversion.

EXAMPLE 9

Catalyst 6 was also run in the laboratory scale fluidized bed reactor with O-X/naphthalene mixed feed and straight naphthalene feed using air containing 0.084 mol percent sulfur dioxide; see Table II. These data show that the catalyst performance with mixed feed is synergistic; e.g., the yield with a 50 percent O-X, 50 percent naphthalene mixed feed is much better than the average of the yields obtained with straight O-X and straight naphthalene feeds. This is probably because naphthalene reacts selectively in the moderated $V_2O_5/SiO_2$ sites of the catalyst which would be non-selective to O-X. Also, very low burnup and very high yields were obtained with straight naphthalene feed.

EXAMPLES 10, 11, 12

Catalysts 7, 8, and 9 were produced in fashion similar to catalyst 1 of example 1 using digested titanyl sulfate hydrate pulp as the titania source. The silica substrate for these catalysts, containing anatase titania, was first doped with 19% $TiO_2$ and calcined 64 hours at 800° C., and the final co-mingled $TiO_2/SiO_2$ material was calcined 8 hours at 800° C. The catalysts were wet with solutions containing various amounts of vanadyl sulfate, potassium pyrosulfate, cesium sulfate and sulfuric acid and calcined 4 hours at 450° C. Catalyst 7 was formulated without cesium, catalyst 8 with higher vanadium, and catalyst 9 with higher cesium (see Table I). For catalyst 7, the substrate was wetted twice to incipient wetness with a solution prepared by adding 20 gm $VOSO_4.2H_2O$ and 45 gm $K_2S_2O_7$ to water to total solution volume of 250 cc. For catalyst 9, the substrate was wetted twice to incipient wetness with a solution prepared by adding 100 gm $VOSO_4.2H_2O$, 225 gm $K_2S_2O_7$, 123.3 gm $Cs_2SO_4$, and 16.7 cc $H_2SO_4$ to water to a total volume of 1 liter. For catalyst 8, the substrate was wetted twice to incipient wetness with the same solution used for catalyst 9 but with twice the vanadia content. The catalysts were run in the laboratory scale fluidized bed reactor at F/W=0.02, A/F=16.6 to 22.2 and 670° to 700° F. with O-X feed. Performance of each is listed in Table III.

TABLE I

| Catalyst No. | Catalyst Properties Composition, % | | | | | Physical Properties | | | |
|---|---|---|---|---|---|---|---|---|---|
| | $TiO_2$ | V | K | S | Ce | S.A. | Pore vol. | Med. Pore | Cat. Den. |
| 1. | 32.2 | 1.80 | 4.64 | 6.4 | 6.53 | 54.5 | .37 | 236 | — |
| 2. | 30.2 | 1.35 | 4.42 | 6.2 | 5.96 | 46.2 | .25 | 226 | — |
| 3. | 26.9 | 1.41 | 4.43 | 5.8 | 6.22 | 50.5 | .33 | 242 | — |
| 4. | 32.9 | 1.73 | 4.34 | 6.0 | 5.75 | 34.6 | .242 | 264 | .77 |
| 5. | 37.4 | 1.18 | — | — | — | — | — | — | — |
| 6. | 33.2 | 1.49 | 4.52 | 6.2 | 6.33 | 46.0 | .30 | 242 | — |
| 7. | 41.0 | 1.5 | 4.99 | 5.3 | <0.05 | — | — | — | — |
| 8. | 38.3 | 2.60 | 4.34 | 6.6 | 6.43 | 33.8 | .226 | 263 | .80 |
| 9. | 38.3 | 1.43 | 4.41 | 5.7 | 7.80 | — | — | — | — |

TABLE II

Performance of the Catalyst with O-X/N Mixed Feeds*

| Catalyst | 6 | 6 | 6 |
|---|---|---|---|
| % N | 0 | 50 | 100 |
| Reactor Conditions | | | |
| A/F | 14.1 | 12.0 | 13.2 |
| F/W | .030 | 04 | 04 |
| Temperature | 700 | 700 | 690 |
| Catalyst Performance | | | |
| N Conversion | — | 100 | 99.4 |
| O-X Conversion | 94.1 | 86.7 | — |
| PA Yield | 93.3 | 108.8 | 104.1 |
| C-8 Yield | 94.8 | 109.3 | 111.4 |
| C-8 Selectivity | 100.7 | — | 112 |
| Frac. Burn-up | .26 | .13 | .02 |

*.084 mol. % $SO_2$ in process air

TABLE III

Effect of Catalyst Composition on Fluid Bed Catalyst Activity

| Catalyst | 7 | 8 | 9 | |
|---|---|---|---|---|
| Type | No Cesium | 83% Higher V | 30% Higher Cesium | |
| Operating Conditions | | | | |
| Temperature | 680 | 680 | 670 | 700 |
| F/W | .0202 | .020 | .020 | .020 |
| Air/Feed | 16.6 | 22.5 | 16.6 | 16.6 |
| Vol % $SO_2$ | .085 | .090 | .090 | .090 |
| Time Cat. on Feed, hrs. | 92 | 53 | 66 | 164 |
| Performance | | | | |
| O-X Conversion | 91.6 | 93.9 | 80.1 | 96.1 |
| PA Yield | 829 | 91.2 | 78.8 | 88.9 |
| C-8 Yield | 84.2 | 94.9 | 83.6 | 90.4 |
| C-8 Selectivity | 92.0 | 101 | 104.4 | 94.0 |
| Burnup | .31 | .252 | .19 | .30 |

We claim:

1. Method of making phthalic anhydride comprising oxidizing a feed selected from orthoxylene, naphthalene and mixtures thereof in the presence of a catalyst made by a method comprising A. impregnating an attrition resistant high-silica substrate having a pore volume greater than 0.1 cc/g and a surface area greater than 10 m²/g with a solution of an acid salt of titanium, drying the impregnated substrate, heating it to decompose the acid salt of titanium, and calcining the resulting impregnated composition at a temperature of at least 450° C. to about 900° C. to obtain a calcined support containing at least about 4% $TiO_2$, which displays essentially the characteristics of anatase-titania as swhon by an X-ray peak at d 3.52, B. wetting the support obtained thereby with at least one solution containing components including at least one soluble vanadium salt which upon calcination will yield vanadium pentoxide, to impregnate the substrate, based on the total finished composition, with up to about 10% by weight potassium present as potassium pyrosulfate, up to about 12% by weight cesium present as cesium pyrosulfate, up to about 5% sulfuric acid, and from about 0.1 to about 8% vanadium present as vanadium pentoxide, and C. drying and calcining the wet support to produce a catalyst with up to 10% by weight potassium as potassium pyrosulfate, up to 12% cesium as cesium pyrosulfate and from about 0.1 to about 8% vanadium, as vanadium pentoxide.

2. Method of claim 1 wherein the impregnating solution described in step A. contains about 20% to about 60% TiO$_2$.

3. Method of making phthalic anhydride comprising oxidizing a feed selected from orthoxylene, naphthalene and mixtures thereof in a fluidized bed of catalyst at a hydrocarbon feed rate to catalyst weight ratio of 0.01 to 0.4, a reactor temperature of about 600° to 800° F., an air to hydrocarbon ratio of 5 to 40, and a reactor pressure of at least 1 atmosphere, wherein the catalyst is made by A. impregnating an attrition resistant high-silica substrate having a pore volume greater than 0.1 cc/g and a surface area greater than 10 m$^2$/g with a solution of an acid salt of titanium, drying the impregnated substrate, heating it to decompose the acid salt of titanium, and calcining the resulting impregnated composition at a temperature of at least 450° C. to about 900° C. to obtain a calcined support containing at least about 4% TiO$_2$, which displays essentially the characteristics of anatase-titania as shown by an X-ray peak at d 3.52.

B. wetting the support obtained thereby with at least one solution containing components including at least one soluble vanadium salt which upon calcination will yield vanadium pentoxide, to impregnate the substrate, based on the total finished composition, with up to about 10% by weight potassium present as potassium pyrosulfate, up to about 12% by weight cesium present as cesium pyrosulfate, up to about 5% sulfuric acid, and from about 0.1 to about 8% vanadium present as vanadium pentoxide, and C. drying and calcining the wet support to produce a catalyst with up to 10% by weight potassium as potassium pyrosulfate, up to 12% cesium as cesium pyrosulfate and from about 0.1 to about 8% vanadium, as vanadium pentoxide.

4. Method of claim 1 wherein the catalyst contains potassium as a pyrosulfate from 0.1 to about 10 wt. %, cesium as a pyrosulfate from 0.1 to about 12 wt. %, vanadium as a pentoxide from 0.1 to 8 wt. % and wherein the titania and silica together comprise about 50 to 98.0 wt. %.

5. Method of making phthalic anhydride comprising oxidizing a feed selected from orthoxylene, naphthalene and mixtures thereof in the presence of a catalyst made by a method comprising co-precipitating into a ground silica having a surface area of at least 50 m$^2$/g and a pore volume of at least 0.1 cc/g, a solution of (V$_2$O$_5$) and a titanium compound selected from titanyl sulfate and ammonium titanyl sulfate and calcining the resulting product.

6. Method of making phthalic anhydride comprising oxidizing a feed selected from orthoxylene, naphthalene and mixtures thereof in the presence of a catalyst made by a method comprising A. impregnating an attrition resistant high-silica substrate having a pore volume greater than 0.1 cc/g and a surface area greater than 10 m$^2$/g with a solution of an acid salt of titanium, drying the impregnated substrate, heating it to decompose the acid salt of titanium, and calcining the resulting impregnated composition at a temperature of at least 450° C. to about 900° C. to obtain a calcined support containing at least about 4% TiO$_2$, which displays essentially the characteristics of anatase-titania as shown by an X-ray peak at d 3.52, B. wetting the support obtained thereby with at least one solution containing components including at least one soluble vanadium salt which upon calcination will yield vanadium pentoxide, to impregnate the substrate, based on the total finished composition, with up to about 10% by weight potassium present as potassium pyrosulfate, up to about 12% by weight cesium present as cesium pyrosulfate, up to about 5% sulfuric acid, and from about 0.1 to about 8% vanadium present as vanadium pentoxide, and C. drying and calcining the wet support to produce a catalyst with up to 10% by weight potassium as potassium pyrosulfate, up to 12% cesium as cesium pyrosulfate and from about 0.1 to about 8% vanadium, as vanadium pentoxide wherein the catalyst has a size in the range of about 30 to about 150 microns and an attrition rate of less than 1% per hour on impingement of three air jets carrying particles of the catalyst at a velocity of about 890 ft/second, and containing potassium as a pyrosulfate from 0.1 to about 10 wt. %, cesium as pyrosulfate from 0.1 to about 12 wt. %, vanadium as a pentoxide from 0.1 to 8 wt. % and wherein the titanium and silica together comprise about 50 to 98.0 wt. %.

* * * * *

UNITED STATES PATENT AND TRADEMARK OFFICE
CERTIFICATE OF CORRECTION

PATENT NO. : 4,912,234

DATED : March 27, 1990

INVENTOR(S) : Leonard A. Cullo et al

It is certified that error appears in the above-identified patent and that said Letters Patent is hereby corrected as shown below:

Column 2, lines 9 and 10, change "prometers" to -- promoters --.

Column 3, line 49, change "0.01 cc/gm" to -- 0.1 cc/gm --;

line 67, change "4,709,770" to -- 4,705,770 --.

Column 11, line 33, claim 3, after "and", first occurrence, beginning with -- C. --, indent as subparagraphs A. and B. above.

Signed and Sealed this

Second Day of April, 1991

Attest:

HARRY F. MANBECK, JR.

*Attesting Officer*      *Commissioner of Patents and Trademarks*